United States Patent [19]
Lewis, Jr. et al.

[11] 4,422,094
[45] Dec. 20, 1983

[54] DIGITAL SIGNAL PROCESSOR WITH SYMMETRICAL TRANSFER CHARACTERISTIC

[75] Inventors: Henry G. Lewis, Jr., Hamilton Square, N.J.; Alfonse Acampora, Staten Island, N.Y.

[73] Assignee: RCA Corporation, New York, N.Y.

[21] Appl. No.: 319,090

[22] Filed: Nov. 6, 1981

[51] Int. Cl.³ .......................................... H04N 9/535
[52] U.S. Cl. ....................................... 358/37; 358/31
[58] Field of Search .................... 358/37, 39, 31, 160, 358/164, 166–168, 111, 27; 382/54; 365/230, 94; 364/736, 751, 754, 718, 721

[56] References Cited

U.S. PATENT DOCUMENTS

| | | | |
|---|---|---|---|
| 3,659,275 | 4/1972 | Marshall | 365/94 |
| 3,777,130 | 12/1973 | Croisier et al. | 235/152 |
| 3,836,812 | 9/1974 | Bennett | 315/18 |
| 4,065,770 | 12/1977 | Berry | 343/5 |
| 4,220,969 | 9/1980 | Nitadori | 358/140 |
| 4,240,106 | 12/1980 | Michael et al. | 358/36 |
| 4,240,113 | 12/1980 | Michael et al. | 358/180 |
| 4,275,415 | 6/1981 | Engle | 358/140 |
| 4,353,092 | 10/1982 | Bailey et al. | 358/166 |
| 4,365,266 | 12/1982 | Lagoni | 358/31 |
| 4,365,304 | 12/1982 | Ruhman et al. | 358/166 |

FOREIGN PATENT DOCUMENTS

| | | | |
|---|---|---|---|
| 55-147882 | 11/1980 | Japan | 358/169 |
| 55-147891 | 11/1980 | Japan | 358/39 |

OTHER PUBLICATIONS

Article "A CCD Comb Filter for Color TV Receiver Picture Enhancement", by D. H. Pritchard, publ. Mar. 1980, RCA Review, vol. 41, pp. 12–15.

U.S. patent application Ser. No. 06/286,264, of R. A. Dischert, entitled Controlled RAM Signal Processor, filed Jul. 23, 1981.

*Primary Examiner*—John C. Martin
*Assistant Examiner*—Edward L. Coles
*Attorney, Agent, or Firm*—E. M. Whitacre; P. J. Rasmussen; E. P. Herrmann

[57] ABSTRACT

A digital memory is provided which contains digital data words representative of a desired symmetrical transfer characteristic of a digital signal processor. Digital signals which are to be processed are applied to the address inputs of the memory, producing output signals in conformance with the desired transfer characteristic. Advantage is taken of the symmetrical nature of the response characteristic to minimize the size of the memory. Data words corresponding to only a portion of the full dynamic range of the digital signal processor are stored in the memory, and memory locations are addressed and read out in accordance with the value of a polarity-determining bit of the input digital signal, with the output signals being translated over the required full dynamic range in accordance with the value of the polarity-determining bit. In a preferred embodiment of the invention, the memory is a random access memory, with stored data values being altered in response to a user control to change the transfer characteristic of the processor.

12 Claims, 5 Drawing Figures

DIGITAL SIGNAL PROCESSOR WITH SYMMETRICAL TRANSFER CHARACTERISTIC

This invention relates to apparatus having a symmetrical transfer function for processing a digital signal and, in particular, to the use of such apparatus for processing a peaking signal in a television receiver.

In a television receiver, it is conventionally necessary to separate the luminance and chrominance signal components of the video signal for separate signal processing. This may be accomplished by simply filtering the video signal to split it into bands of high frequency components (for chrominance) and low frequency components (for luminance), but a preferred technique is to take advantage of the interleaved nature of the luminance and chrominance components by separating the signals in a comb filter. In the comb filter, two or more successive lines of video information are additively and subtractively combined to produce separated luminance and chrominance signals at outputs exhibiting complementary comb-like response characteristics. When the video signal is comb filtered over the full video frequency band, however, both chrominance and luminance information will be provided in the signal at the output nominally termed the chrominance output. In the NTSC television system, the chrominance information will occupy the frequency band above about 2.0 MHz in this output signal, and luminance information, termed vertical detail information, will be located below approximately 1.0 MHz, the exact upper frequency limit of the vertical detail information being a function of scene content.

When the video information is to be processed digitally, the digitally encoded chrominance and vertical detail information signals may be separated by a single finite impulse response filter, as described in concurrently filed U.S. patent application Ser. Nos. 319,109 and 319,061 on Nov. 6, 1981. The chrominance information may then be demodulated and processed in a digital chrominance signal processor, and the vertical detail information is combined with the comb filtered luminance signal developed at the luminance output of the comb filter to produce a fully restored luminance signal.

In addition to restoring the vertical detail information in the luminance signal, it has been found to be desirable to add an extra amount of vertical detail information to the luminance signal as a peaking signal, which favorably produces a sharper, crisper, reproduced image. Experiments have shown that it is also desirable to process the peaking signal, prior to combining it with the restored luminance signal, in a circuit which exhibits a particular non-linear signal amplitude transfer function characteristic. Such a non-linear processing circuit for analog signals is described and shown in U.S. Pat. No. 4,245,237. This processing circuit subjects vertical detail signals of different amplitudes to different amounts of signal gain. Specifically, small amplitude signals are translated with a prescribed low gain, referred to as coring, to attenuate low amplitude noise. Moderate amplitude signals are subjected to enhancement (peaking), and large amplitude signals are subjected to amplitude reduction (paring).

It is an object of the present invention to provide a digital signal processing system for a digital vertical detail signal. In accordance with the principles of the present invention, a digital memory is provided which contains digital data words representative of the desired transfer characteristic of the signal processor. Digital signals which are to be processed are applied to the address inputs of the memory, producing output signals in conformance with the desired transfer characteristic. Advantage is taken of the symmetrical nature of the response characteristic to minimize the size of the memory. Data words corresponding to only a portion of the full dynamic range of the digital signal processor are stored in the memory, and memory locations are addressed and read out in accordance with the value of a polarity-determining bit of the input digital signal, with the output signals being translated over the required full dynamic range in accordance with the value of the polarity-determining bit.

It is further desirable to allow the amount of peaking to be adjustable by the viewer, since different viewers may prefer differently peaked images. In accordance with a further aspect of the present invention, the memory used in the processor is a random access memory. A microprocessor is responsive to a user-controlled control signal for generating a table of values for the random access memory. The generated table of values is temporarily stored in a buffer memory. During a portion of the television signal interval when the processor is not receiving display information, such as the vertical blanking interval, the microprocessor inhibits the addressing of the random access memory by the vertical detail information lines and changes the mode of operation of the memory from read to write. The buffer memory then transfers the new table of values into the properly addressed locations of the random access memory under control of the microprocessor. Upon completion of the transfer, the random access memory reverts to the read mode under address control by the vertical detail information signals. The applied vertical detail information signals are now processed in accordance with the transfer characteristic of the new table of values stored in the random access memory.

Figure 1:
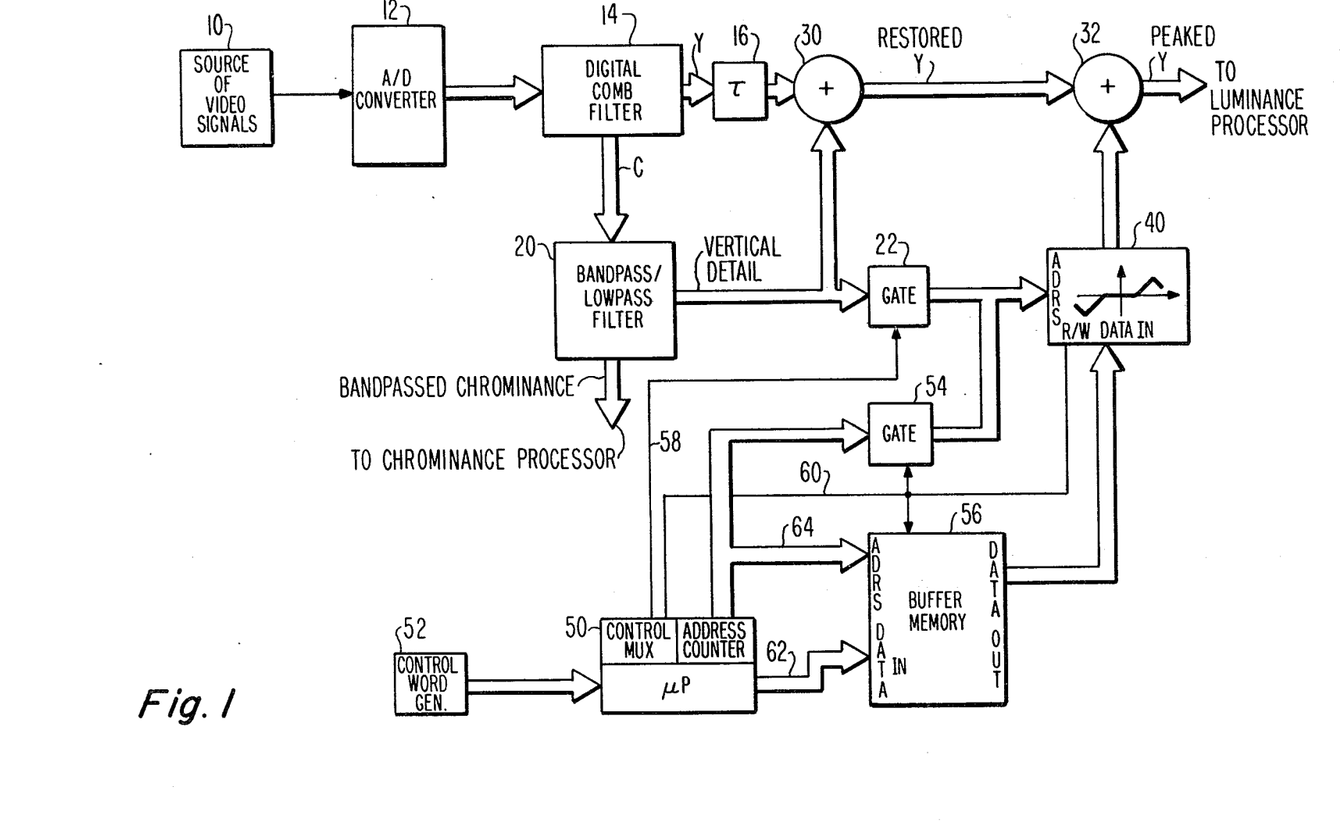
FIG. 1 illustrates, in block diagram form, a digital nonlinear vertical detail signal processor system constructed in accordance with the principles of the present invention.

Referring to FIG. 1, a digital signal processing section of a television receiver is shown. In this embodiment of the present invention, the broad arrows shown in the drawing figure represent parallel lines of digital information which couple digital words of a plurality of bits from one element to another. Video signals are supplied from a source of video signals 10 which may comprise, for instance, a video detector in the television receiver. The video signals are applied to an analog to digital converter 12, which converts the analog video signals to digital signals in the form of successive eight-bit words, for instance. The digital signals are applied to the input of a digital comb filter 14, which separates the signals into separate luminance (Y) and chrominance (C) components. The digital comb filter 14 may be constructed to operate as described in the article "Digital Television Image Enhancement" by John P. Rossi, 84 SMPTE at 545–51 (1974). The separated Y signal is applied by way of a delay element 16 to an input of an adder 30. The delay τ of the delay element 16 is chosen to substantially match the delay encountered by a vertical detail signal as it is processed by a combination bandpass and lowpass filter network 20, which is coupled between the C output of the comb filter 14 and a second input of adder 30. The bandpass/lowpass filter 20 may be constructed as described in concurrently filed U.S. patent application Ser. No. 319,061, entitled DIGITAL SIGNAL SEPARATION FILTERS. The bandpass/lowpass filter 20 produces a bandpassed chrominance signal at one output, which may be applied to the input of chrominance signal processing circuitry (not shown). The bandpass/lowpass filter 20 also produces a lowpass filtered vertical detail signal at a second output, which is applied to the adder 30, and to the input of a gate 22. The adder 30 combines the vertical detail signal with the combed luminance signal to produce a restored luminance signal. The restored Y signal is applied to one input of an adder 32, where a vertical peaking signal component is added to the restored Y signal. The resulting peaked Y signal is then coupled to luminance signal processing circuitry (not shown).

When the gate 22 is closed in response to the application of a control signal to its control input, it operates to couple vertical detail signals to the address inputs of a nonlinear detail signal processing random access memory (RAM) 40. The RAM 40, operating in the read mode, produces an output word for each digital word of vertical detail information applied to its address inputs. The data words stored in addressable locations of the RAM cumulatively define the nonlinear vertical detail transfer characteristic of cored, peaked and pared regions described previously and illustrated graphically in block 40 of FIG. 1. The output words of the RAM 40 comprise peaking signal information, which is combined with the restored Y signal by adder 32.

The transfer characteristic of the detail signal processing RAM 40 may be altered by changing its stored data in response to a user control. A control word generator 52, which may comprise a remote control unit or digital control device on the television receiver, produces a control word under user control. The control word generator is coupled to an input of a microprocessor system 50. The microprocessor system 50 has a data output bus 62 coupled to the data input of a buffer memory 56, an address bus 64 coupled to the input of a gate 54 and the address inputs of the buffer memory 56, a control line 58 coupled to the control input of gate 22, and a control line 60 coupled to the control input of gate 54 and the read/write control inputs of RAM 40 and buffer memory 56. The output of gate 54 is coupled to the address input of RAM 40, and the output of buffer memory 56 is coupled to the data input part of RAM 40.

When the arrangement of FIG. 1 is receiving active video information for display on the television kinescope, the control multiplexer section of the microprocessor system 50 produces a signal level on line 60 which opens gate 54 (i.e., gate 54 passes no signals), and maintains RAM 40 in its read mode. The control multiplexer section of the microprocessor 50 also produces a signal level on line 58 which closes gate 22 to apply vertical detail information signals to the address inputs of RAM 40. The RAM 40 produces translated vertical detail signals at its output in accordance with the transfer characteristic defined by the array of data stored in the RAM.

When the user adjusts the peaking control of the television receiver, the value of the control word produced by the control word generator 52 will change. This change in the control word value is sensed by the microprocessor through a polled or priority interrupt, for example. The microprocessor is programmed to operate upon the control word value to generate a new table of values for the RAM 40. The new table of values defines a new transfer characteristic for the vertical detail processing RAM 40 which is a function of the control word. The new data table is stored in the buffer memory 56 by way of data bus 62, whle the buffer memory is addressed by signals on address lines 64 under control of an address counter section of the microprocessor 50. The signal on control line 60 maintains the buffer memory 56 in a write mode as the new data table is loaded into the memory.

Once the transfer of data into the buffer memory 56 is completed, the microprocessor waits for the video signal to reach a period during which no active video information is being applied to the address input of RAM 40 by gate 22, such as the vertical blanking interval. An arrangement for providing the microprocessor with this capability is shown in U.S. patent application Ser. No. 280,475, filed July 6, 1981, and entitled METHOD AND APPARATUS FOR OPERATING A MICROPROCESSOR IN SYNCHRONISM WITH A VIDEO SIGNAL. During the inactive video period, the control signals on lines 58 and 60 are changed by the microprocessor to open gate 22 and close gate 54. The signal on control line 60 also places RAM 40 in its write mode, and buffer memory 56 in its read mode. The address counter of the microprocessor system 50 now addresses the RAM 40 through gate 54, and the buffer memory directly by way of address bus 64. The new data table stored in the buffer memory 56 is thereby loaded into the RAM 40. Upon completion of the data transfer, the control signals on lines 58 and 60 are changed to place the RAM 40 in its read mode, and turn address control of the RAM over to the vertical detail information signals coupled by gate 22. Thereafter, the applied vertical detail signals are modified by the RAM 40 in accordance with the transfer characteristics defined by the new data table stored in the RAM.

The arrangement of FIG. 1 advantageously permits the use of an inexpensive low-speed microprocessor in the microprocessor system 50. The address counter of the microprocessor may transfer generated data table values from the microprocessor to the buffer memory 56 at a relatively low data rate. Obviously, the data can be stored in the buffer memory no faster then it is generated by the microprocessor. It is possible, for instance, for several video fields to pass while the data table is being generated. However, the low data transfer rate of the address counter section of the microprocessor system 50 may be too slow to transfer the full data table from the buffer memory 56 to the RAM 40 during one vertical blanking interval. If that is the case, an auxiliary address counter may be used to read the data out of the buffer memory 56 and write it into the RAM 40 at a much higher rate, permitting the full data transfer to be achieved during one vertical blanking interval.

Figure 2:
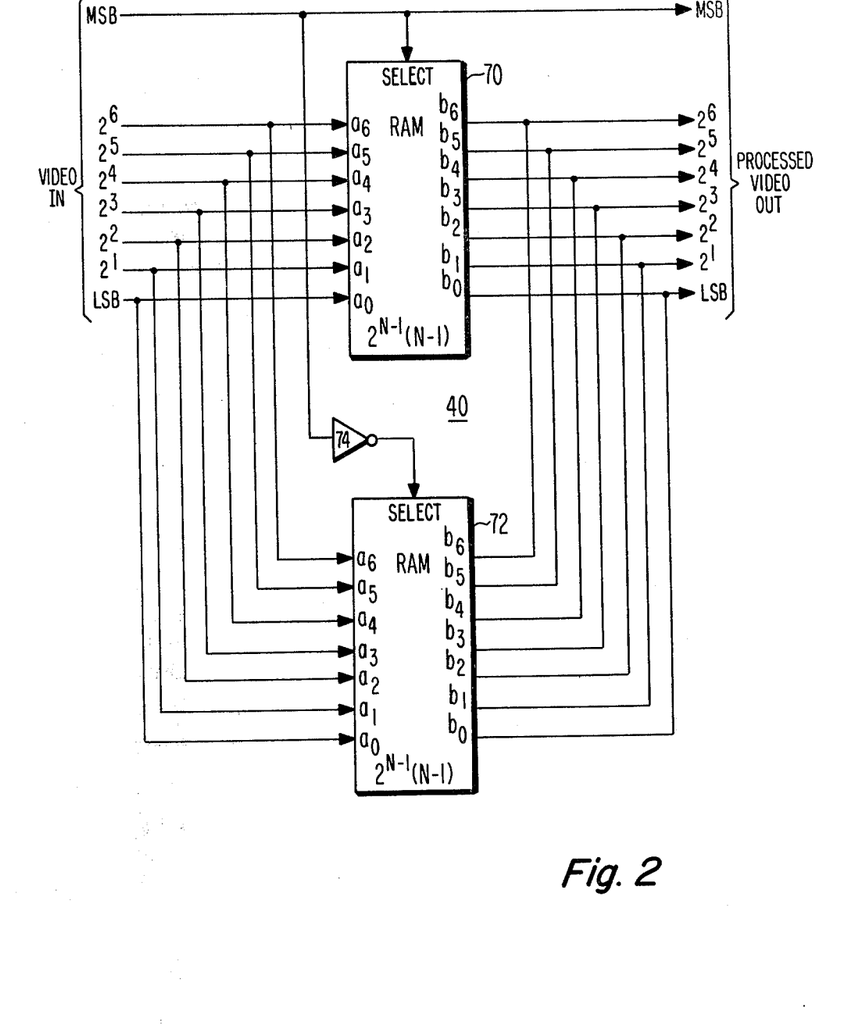
FIG. 2 illustrates, in block diagram form, a random access memory arrangement suitable for use in the signal processor of FIG. 1.

FIG. 2 shows an arrangement constructed in accordance with the principles of the present invention and suitable for use as the RAM processor 40 of FIG. 1. For ease of illustration, the connection of RAMs 70 and 72 to the buffer memory, gate 54, and control line 60 have been omitted.

In FIG. 2, the vertical detail information is illustratively shown as an eight-bit word applied on input lines for the most significant bit (MSB), the least significant bit (LSB) and bits $2^6$ through $2^1$ of intermediate values. The seven lower order bits $2^6$ through LSB of the input signal are applied to address inputs $a_6$-$a_0$ of two RAMs 70 and 72. The MSB of the input signal is applied to an enabling "select" input of RAM 70, and to the input of an inverter 74. The output of inverter 74 is coupled to the "select" input of RAM 72. When selected, each RAM produces a seven-bit output signal on output lines $b_6$-$b_0$, which are respectively bussed together to provide bits $2^6$ through LSB of the processed output signal.

Because the transfer characteristic of the processor 40 has a symmetrical polarity about a mid-point value of the dynamic range of the input signal, the MSB need not be applied to the address inputs of RAMs 70 and 72. The MSB thus bypasses the RAMs and determines the polarity of the eight-bit output word directly. When the input signal is of a value located in one half of its dynamic range, the MSB will be of a sense to select one of the RAMs and not the other. The translated output signal will have a magnitude determined by the seven-bit output signal of the selected RAM, and a polarity determined by the sense of the MSB (i.e., either a 0 or a 1). When the input signal is of a value located in the other half of its dynamic range, the MSB selects the other RAM, which provides the magnitude of the translated output signal. The polarity of the output signal is again determined by the MSB. It is noted that it may be necessary to delay the MSB in its direct path from the input to the output to account for the memory access time delay encountered by the lesser significant bits.

It may be seen that the vertical detail processor 40 of FIG. 1 may be arranged as a RAM coupled to receive an eight-bit input signal for producing a processed eight-bit output signal. In that arrangement, the RAM would have to have a capacity of $2^N$ (N) bits, or 2048 bits. The arrangement of FIG. 2 takes advantage of the polarity symmetry of the transfer characteristic of the processor, which obviates the need to apply the MSB as an address bit to the RAMs, as well as the need for a translated MSB output bit. The capacity of each RAM is therefore $2^{N-1}$ (N−1), or 896 bits. The two RAMs together must only provide storage for 1792 bits in the eight-bit example of FIG. 2.

Figure 3:
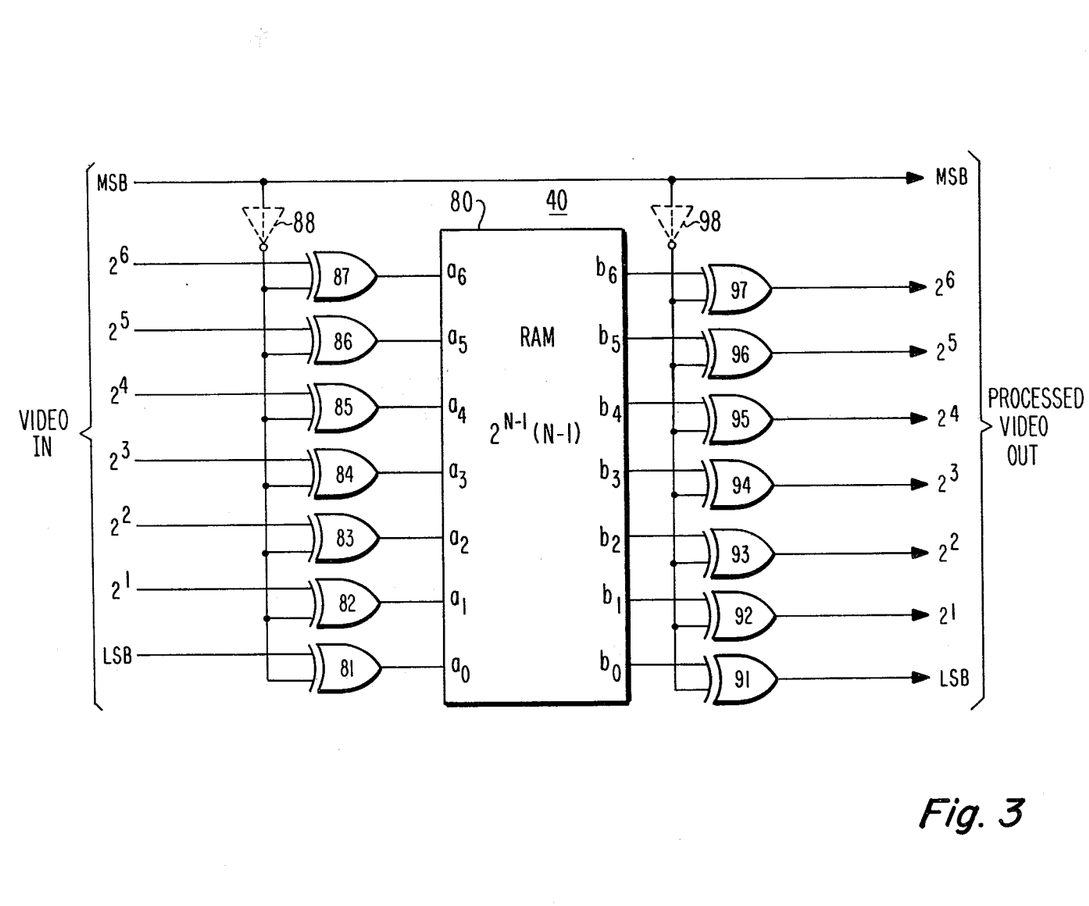
FIG. 3 illustrates, in block digram form, a preferred random access memory embodiment constructed in accordance with the principles of the present invention and suitable for use in the signal processor of FIG. 1.

A second embodiment of a RAM processor suitable for use as the vertical detail processing RAM 40 of FIG. 1 is shown in FIG. 3. In this embodiment, the seven lower order bits $2^6$ through $2^1$ and LSB of an eight-bit input signal are applied to the respective inputs of seven exclusive-OR gates 87 through 81. The MSB of the input signal is applied to second inputs of each of the seven exclusive-OR gates 87 through 81. The outputs of exclusive-OR gates 87 through 81 are coupled to the seven address inputs $a_6$-$a_0$ of a RAM 80. The seven outputs $b_6$-$b_0$ of the RAM 80 are coupled to respective inputs of exclusive-OR gates 97 through 91. The MSB of the input signal is applied to second inputs of exclusive-OR gates 97 through 91. The seven lower order output bits $2^6$ through $2^1$ and LSB of a processed output signal are produced at the outputs of exclusive-OR gates 97 through 91. The MSB of the input signal is also the MSB of the output signal. Again, it may be necessary to delay the MSB between the input and the output of the system, the equalize the memory access time delay encountered by the lesser significant bits.

Figure 4:
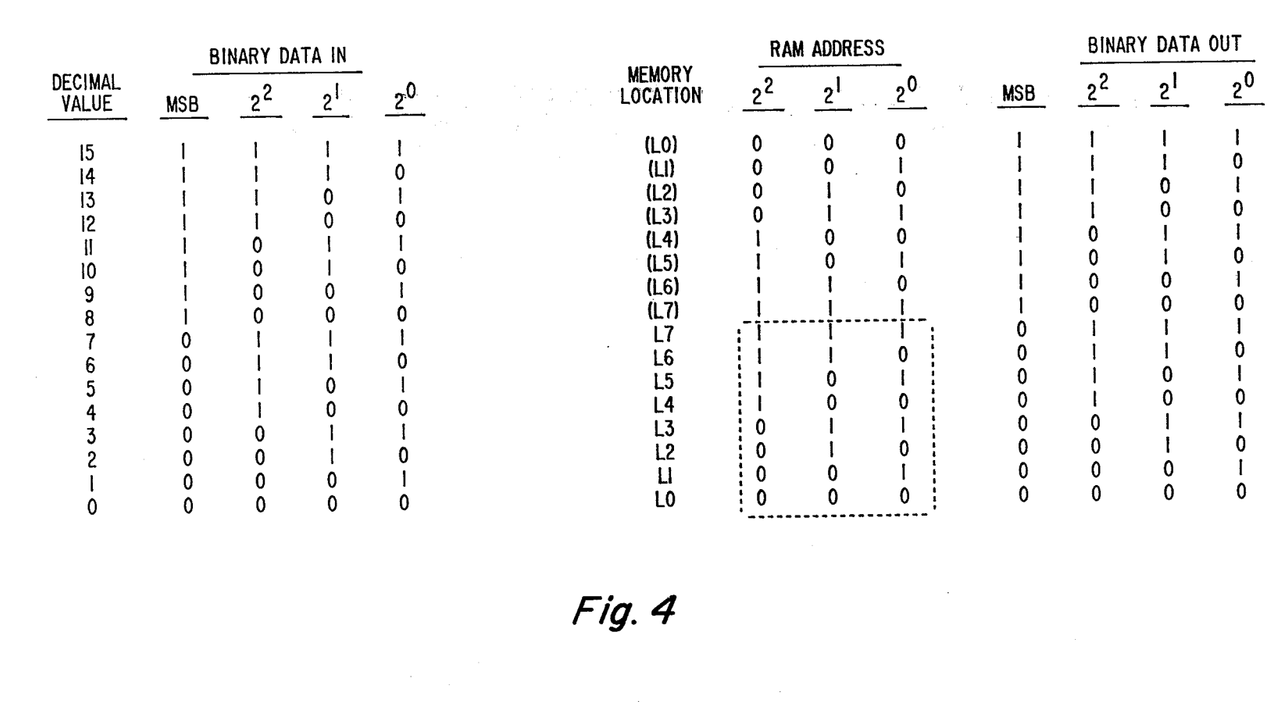
FIGS. 4 and 5 illustrate tables depicting the operation of the embodiment of FIG. 3.
Figure 5:
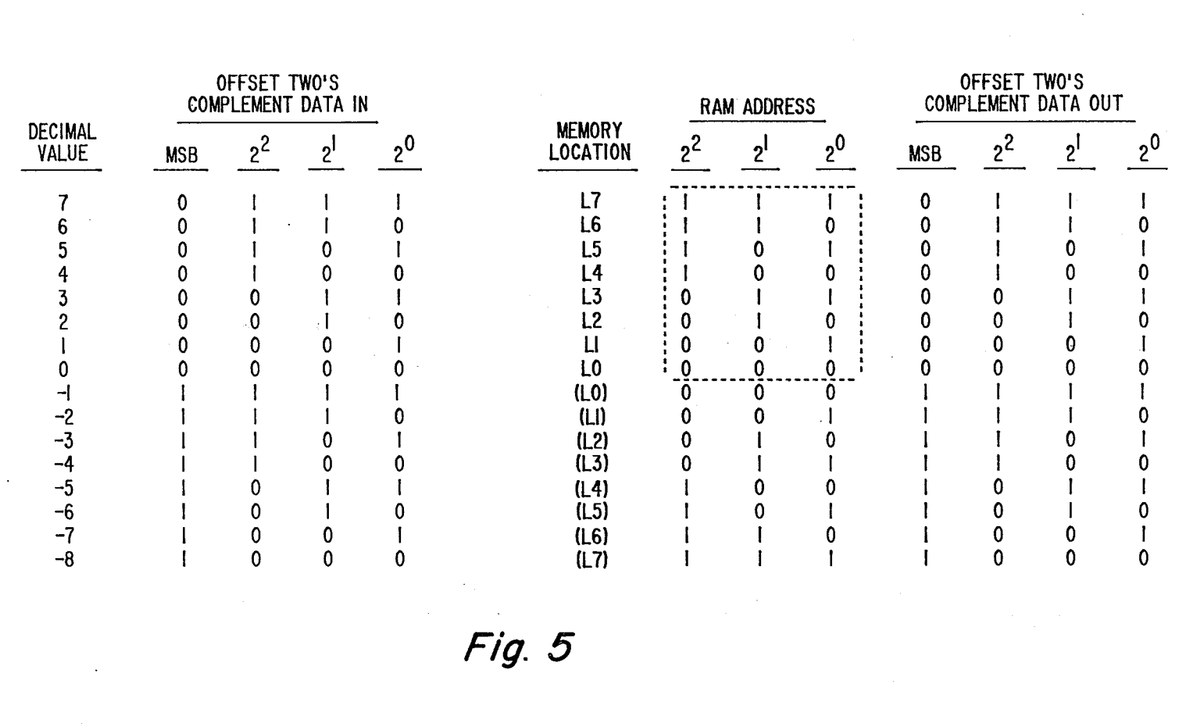

The operation of the embodiment of FIG. 3 is exemplified by the tables of FIGS. 4 and 5. These tables illustrate the principles of the processor of the present invention in terms of four-bit signals, which are equally applicable to the eight-bit processor of FIG. 3.

In FIG. 4, the table with the heading "Binary Data In" shows the binary words and their decimal equivalents for the dynamic range of a four-bit input signal. The dynamic range extends from a minimum value of 0000, decimal 0, to a maximum value of 1111, or decimal 15. The range is seen to include sixteen levels.

The dashed box shown in the center table of FIG. 4, labelled "RAM Address", contains the data stored in the RAM for a linear, unity gain transfer characteristic. The RAM contains eight addressable memory locations, indicated as L0 through L7. Three bits are stored at each address location. For a linear unity gain transfer characteristic, the digital data stored in each memory location is the same as the digital address for that location; for example, when memory location L5 is addressed by the digital address word 101, the digital word produced by the RAM is 101.

For a unity gain transformation, the processed output signal values are the same as the input signal values. For instance, assume that the input signal to the processor has a value of 0101, or decimal 5. The MSB, 0, is exclusive-ORed with the lesser significant bits 1, 0, and 1, to produce the address for the RAM. The exclusive-ORing of an MSB of 0 does not change the value of the address bits, whch are 101. These address bits select location L5 of the RAM, which produces output bits 101. These RAM output bits are exclusive-ORed with the MSB of 0 to produce the lesser significant bits of the output signal, in this example, 101. The MSB is passed directed to the output, forming the complete output word of 0101.

Now assume that the input signal to the processor has a value in the upper half of the dynamic range, including decimal values 8–15. If the input signal has a value of 1101, which is decimal 13, for example, the MSB of 1 is exclusive-ORed with the lesser order bits 101. This exclusive-ORing produces an address of 010 for the RAM, which addresses memory location L2. The data word stored in location L2, 010, is produced at the output of the RAM. The 010 bits are exclusive-ORed with the MSB of 1 to produce the three lower order bits of the output signal, in this case 101. The MSB is passed directly to the output, forming the complete output word of 1101.

FIG. 4 illustrates that the arrangement of FIG. 3 will process an input signal over its full dynamic range for a symmetrical transfer characteristic with a RAM having a capacity of $2^{N-1}$ (N−1). For the example of FIG. 4, N is equal to four, and $2^{N-1}$ (N−1) is therefore equal to 8(3)=24, as shown by the twenty-four bits enclosed in the dashed box. In FIG. 3, where N=8 for eight-bit input and output signals, $2^{N-1}$ (N−1) is equal to 896, which is an improvement of required data storage as compared with the embodiment of FIG. 2.

FIG. 5 shows data tables similar to those of FIG. 4, in that four-bit input signals are transformed into four-bit output signals with unity gain. The tables of FIG. 5 differ from those of FIG. 4 because the input signals and the RAM data are in offset two's complement notation instead of conventional binary notation. Binary words are converted to offset two's complement notation by inverting the MSB of the words. This forms an array as shown by the Data In table of FIG. 5, comprising ascending positive and descending negative values from a median zero value. The offset two's complement notation is advantageous in many cases because the location of zero at the center of the number system tends to minimize register over-and under-flows as signals are combined and processed. For offset two's complement signals, data words corresponding to positive signal values are stored in the RAM as outlined by the dashed block. Negative decimal value words in the lower half of the number system are converted by the exclusive-OR gates at the input and converted again at the output of the RAM to make use of the stored data words over the full signal range, as was the case for the upper half of the binary number range of FIG. 4.

It may be seen that the sequence of memory addressing illustrated in the "Memory Location" column of FIG. 4 progresses in the sequence L0, L1 ... L6, L7 for decimal input signal values of 0 through 7, then progresses in the reverse sequence, L7, L6 ... L1, L0 for decimal input signal values of 8 through 15. By inverting the MSB which is applied to the exclusive-OR gates in FIG. 3, as indicated by broken line inverters 88 and 98, the sequence of memory location addressing can be changed to L7, L6 ... L1, L0, L0, L1 ... L6, L7 which is the same as the memory location sequence shown in the "Memory Location" column of FIG. 5. The option of inverting the MSB at the inputs of the exclusive-OR gates permits the RAM 80 to be addressed in a complementary sequence over the dynamic range of the applied input signal. The same principle is applicable to the address and data tables of FIG. 5.

It is also possible to invert the transfer characteristic of the processor through selective inversion of the MSB which is applied to either the input or output exclusive-OR gates, while operating on the same data table stored in the RAM. If the MSB is inverted from the input word to the output word, and if the MSB is applied to either the input exclusive-OR gates 81–87 or the output exclusive-OR gates 91–97 in inverted form, the result will be an inversion of the transfer response characteristic of the processor. This feature is applicable to use of the processor with either binary or offset two's complement signal forms.

It may be appreciated that if the transfer characteristic of the RAM processor of FIGS. 2 and 3 is to be fixed, and not user controllable, the RAMs of the FIGURES may be replaced with read-only memories (ROMs) which utilize the principles of the present invention to reduce the storage required of the ROM or the ROMs.

What is claimed is:

1. In a television receiver, including a source of digital video signals of N-bit words, including an Nth most significant bit, and occupying a dynamic range of M signal levels, a digital signal translation circuit comprising:
   a digital memory having an address input coupled to receive said digital video signals and an output at which translated video signal components of less than N bits are produced; said digital memory storing a table of digital signals of less than N times M bits; and
   means for combining said Nth bit of said digital video signals with said translated video signal components to produce translated digital video output signals occupying a given dynamic range.

2. The arrangement of claim 1, wherein said digital memory comprises first and second digital memory devices, each having an address input coupled to receive at least a portion of said bits of said N-bit digital video signals, and an output; and
   means responsive to said Nth bit of said digital video signals for selectively applying signal components from one of said outputs to said combining means.

3. The arrangement of claim 2, wherein each of said address inputs of said digital memory devices is coupled to receive N-1 bits, and each digital memory device is capable of storing a table of digital signals occupying (M/2)(N−1) bits.

4. The arrangement of claim 1, further including
   means, coupled between said source of digital signals and said address input of said digital memory for producing address signals for said memory in response to the value of said digital video signals; and
   means, coupled between said output of said digital memory and said combining means, for producing decoded output signal components in response to said translated video signal components.

5. The arrangement of claim 4, wherein said address signal producing means comprises a plurality of exclusive-OR gates, each having a first input responsive to said Nth bit of said digital video signals, a second input responsive to a bit of said digital video signals other than said Nth bit, and an output coupled to said address input of said digital memory; and
   said decoded output signal producing means comprises a plurality of exclusive-OR gates, each having a first input coupled to the output of said digital memory, a second input coupled to receive said Nth bit of said digital video signals, and an output coupled to said combining means.

6. The arrangement of claim 5, wherein said digital memory device is capable of storing a table of digital signals occupying (M/2)(N−1) bits.

7. In a television receiver, including a source of digital vertical detail signals of N-bit words, a digital vertical detail signal processor comprising:
   a random access memory having an address input coupled to said source of digital vertical detail signals, a read/write mode control input, a data input, and an output at which a processed vertical detail signal is produced, said output exhibiting a transfer response which is a function of the memory address and a table of data stored in said memory;
   means for producing a control word indicative of the desired transfer function of said random access memory;
   a microprocessor having a first output controllably coupled to said address input of said random access memory, a second output coupled to said mode control input of said random access memory, and a third output, said microprocessor responsive to said control word for generating a data table for said random access memory thereby determining its transfer function; and
   a buffer memory having an address input coupled to said microprocessor, a data input coupled to the third output of said microprocessor, and an output coupled to said data input of said random access memory for temporarily storing and transferring said generated data table to said random access memory.

8. The arrangement of claim 7, wherein said microprocessor places said random access memory in its write mode and controls the address input of said random access memory for transferring a generated data table to said memory during a period of time when said random access memory is not receiving vertical detail signals for display.

9. The arrangement of claim 8, further comprising a first gate coupled between said source of digital vertical detail signals and said address input of said random access memory, and a second gate coupled between said first output of said microprocessor and said address input of said random access memory, and wherein said microprocessor includes means for closing said first gate and opening said second gate when said random access memory is in its read mode, and opening said first gate and closing said second gate when said random access memory is in its write mode.

10. The arrangement of claim 7, wherein said digital vertical detail signals comprise N bit words occupying a dynamic range of M signal level values and said table of data comprises less than N times M bits.

11. The arrangement of claim 10, wherein said table of data comprises two times (M/2) times (N−1) bits.

12. The arrangement of claim 10, wherein said table of data comprises (M/2) times (N−1) bits.

* * * * *

Disclaimer 4,422,094.—*Henry G. Lewis, Jr.*, Hamilton Square, N.J. and *Alfonse Acampora*, Staten Island, N.Y. DIGITAL SIGNAL PROCESSOR WITH SYMMETRICAL TRANSFER CHARACTERISTIC. Patent dated Dec. 20, 1983. Disclaimer filed Sept. 21, 1984, by the assignee, *RCA Corp.*

Hereby enters this disclaimer to all claims of said patent.

[*Official Gazette December 4, 1984.*]